United States Patent
Takehana et al.

(10) Patent No.: US 6,332,329 B1
(45) Date of Patent: Dec. 25, 2001

(54) SWASH PLATE TYPE VARIABLE DISPLACEMENT COMPRESSOR

(75) Inventors: Kouetsu Takehana; Masanori Ogawa; Shinichiro Higashihara; Masaki Kawachi; Hiroyuki Makishima, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/600,625

(22) PCT Filed: Nov. 26, 1999

(86) PCT No.: PCT/JP99/06598

§ 371 Date: Jul. 20, 2000

§ 102(e) Date: Jul. 20, 2000

(87) PCT Pub. No.: WO00/32933

PCT Pub. Date: Jun. 8, 2000

(30) Foreign Application Priority Data

Nov. 27, 1998 (JP) ................................ 10-337955

(51) Int. Cl.[7] ................ F25B 1/00; F25B 49/00
(52) U.S. Cl. ................ 62/227; 62/196.3; 62/115
(58) Field of Search .................. 62/227, 228.3, 62/228.5, 228.4, 115, 196.3; 417/222.2, 222.1

(56) References Cited

U.S. PATENT DOCUMENTS

| | | | |
|---|---|---|---|
| 4,669,272 | * 6/1987 | Kawai et al. | 62/228.3 |
| 4,886,423 | * 12/1989 | Iwanami et al. | 62/228.5 |
| 4,932,843 | * 6/1990 | Itoigawa et al. | 417/222.1 |
| 5,025,636 | * 6/1991 | Terauchi | 62/115 |
| 5,201,189 | * 4/1993 | Yokomachi et al. | 62/196.3 |
| 5,205,718 | * 4/1993 | Fugisawa et al. | 417/222.2 |
| 5,577,894 | * 11/1996 | Kawaguchi et al. | 417/222.2 |
| 5,653,119 | * 8/1997 | Kimura et al. | 62/228.5 |
| 6,119,473 | * 9/2000 | Kishita et al. | 62/228.4 |
| 6,234,763 | * 5/2001 | Ota et al. | 417/222.2 |

FOREIGN PATENT DOCUMENTS

| | | |
|---|---|---|
| 64-56972 | 3/1989 | (JP) . |
| 6-89741 | 11/1994 | (JP) . |
| 9-228957 | 9/1997 | (JP) . |
| 10-141219 | 5/1998 | (JP) . |
| 2000161208 | * 6/2000 | (JP) . |
| 2000161209 | * 6/2000 | (JP) . |
| 2000283030 | * 10/2000 | (JP) . |
| 2000291540 | * 10/2000 | (JP) . |
| 1067287 | * 1/2001 | (JP) ............... F04B/27/08 |

* cited by examiner

Primary Examiner—John A. Jeffery
Assistant Examiner—Leonid M Fastovsky
(74) Attorney, Agent, or Firm—McDermott, Will & Emery

(57) ABSTRACT

When a solenoid 42 of a flow-rate control valve drive mechanism is demagnetized, a pilot valve 41 is closed for introduction of working pressure into a pressure chamber 35 of a flow-rate control valve 31 to be stopped, and a spool valve 33 is closed for a low-pressure side refrigerant path 25 to be closed and for a refrigerant suction rate to a refrigerant suction chamber 7 to be reduced to a zero.

8 Claims, 3 Drawing Sheets

SWASH PLATE TYPE VARIABLE DISPLACEMENT COMPRESSOR

TECHNICAL FIELD

The present invention relates to a variable swash plate displacement compressor assembled in a refrigeration cycle of an air conditioning system for a vehicle and the like and adapted to compress refrigerant gas.

BACKGROUND ART

In swash plate variable displacement compressors, there is a known compressor as disclosed in Japanese Patent Publication No. 6-89741. This discloses, for example, that exciting current of a solenoid controls an opening degree of a pilot valve. High-pressure side refrigerant in a refrigerant discharge chamber is caused to act on a back portion of a piston valve. The piston valve controls a flow-rate of refrigerant flowing into a refrigerant suction chamber.

DISCLOSURE OF INVENTION

In the above art, a swash plate variable displacement compressor has a basic structure of so-called clutch-attached type, which has an electromagnetic clutch incorporated into a compressor driving pulley. Therefore, not only complication of the structure but also weight increase is caused. Moreover, the number of parts increases, and it is disadvantageous in terms of cost.

In a drive state of the compressor connected with the clutch, when a flow-rate of refrigerant is reduced to a zero for preventing an evaporator from freezing, the refrigerant flowing into the refrigerant suction chamber of the compressor, it is necessary to maximize the exciting current of the solenoid that operates the pilot valve and to bring the piston valve to a full stroke on a valve-opening side, thus to increase power consumption.

It is an object of the present invention to provide a variable displacement swash plate compressor in which operation of the compressor can be turned on and off without attaching the clutch, thereby obtaining a structure without the clutch. It is another object of the present invention to provide a variable displacement swash plate compressor in which a solenoid is demagnetized for operating a pilot valve that controls a flow-rate of the refrigerant and a flow-rate of refrigerant is reduced to a zero, the refrigerant flowing into a refrigerant suction chamber of the compressor, thereby preventing an evaporator from freezing.

To achieve the objects, a first aspect of the invention is provided with a variable displacement swash plate compressor which has a flow-rate control valve installed in a low-pressure side refrigerant path upstream refrigerant suction chamber, and having a spool valve, a spring for biasing the spool valve in a valve closing direction, and a pressure chamber for accumulating pressure for the spool valve to be worked in the valve opening direction; and a flow-rate control valve drive mechanism installed in a path for communication between a refrigerant discharge chamber and the pressure chamber, and having a pilot valve to be normally closed by a spring and to be controlled of a valve opening degree by an exciting current of a solenoid for a high-pressure side refrigerant of the refrigerant discharge chamber to be introduced and controlled as working pressure to the pressure chamber. A flow-rate of a refrigerant to flow in the refrigerant suction chamber is controlled for pressures of the refrigerant suction chamber and a crank chamber to be regulated.

Preferably, the spool valve has a spool groove having opposite side faces having pressure receiving areas equal to each other.

Preferably, the flow-rate control valve drive mechanism detects an evaporator-side pressure upstream the flow-rate control valve, for the pilot valve to be operated in the valve opening direction or a valve closing direction when the evaporator-side pressure varies from a certain pressure with the pilot valve being in a predetermined opening degree, for an opening degree of the flow-rate control valve to be regulated, and for the evaporator-side pressure to be kept at a constant value.

Preferably, the flow-rate control valve drive mechanism has a pressure regulating path for communication between the crank chamber and the evaporator-side of the low-pressure side refrigerant path upstream the flow-rate control valve.

Preferably, the flow-rate control valve drive mechanism has a pressure regulating path for communication between the pressure chamber of the flow-rate control valve and the refrigerant suction chamber.

Preferably, a variable displacement swash plate compressor further has: a temperature detector for detecting a temperature of an evaporator; and a controller for controlling a valve opening degree of the pilot valve in accordance with the temperature of the evaporator detected by the temperature detector.

Preferably, the controller demagnetizes the solenoid for the pilot valve to be closed when the temperature detector detects the temperature of the evaporator less than a freezing temperature.

A second aspect of the invention is provided with a control method for a variable displacement swash plate compressor which has: demagnetizing a solenoid for a pilot valve to be closed when an evaporator is at a temperature less than a freezing temperature; closing a spool valve for a pressure of a refrigerant suction chamber to be fallen lower than that of a crank chamber; and raising an inclined swash plate for a compressing work of the compressor to be reduced to substantially a zero.

According to the above-described inventions, when an electric current which is supplied to a solenoid of a flowrate control valve drive mechanism is reduced to a zero for the solenoid to be demagnetized, a pilot valve is closed. In order to stop supplying working pressure to a pressure chamber by the flow-rate control valve, a spool valve is closed for a flow-rate of the refrigerant flowing in a refrigerant suction chamber to be reduced to a zero. Falling pressure of an evaporator-side upstream the flow-rate control valve of a low-pressure side refrigerant path is stopped, thus preventing the evaporator from freezing.

Therefore, when operating an evaporator for preventing freezing, supplying an exciting current to a solenoid is stopped. Power consumption is reduced and totally closing a spool valve makes a load of the compressor substantially a zero, thus to improve output of a drive source.

Supplying an exciting current to a solenoid is stopped for a spool valve of a flow-rate control valve to be operated to close. Pressure of a refrigerant suction chamber is fallen for differential pressure between the crank chamber and the refrigerant suction chamber to be a maximum value. Inclined swash plate is raised for a piston stroke to be a minimum value and for compressing work to be reduced to substantially a zero, and thus exciting and demagnetizing the solenoid allows operation of a compressor to be turned off and on without a clutch.

Therefore, a structure of the compressor is simplified, a size and a weight of the structure are reduced, and the structure is obtained at advantage cost.

Pressure receiving areas of the opposite side faces of a spool groove installed to a spool valve of a flow-rate control valve are equal to each other. Only controlling a spring force of a spring for biasing the spool valve in a valve closing direction and working pressure that acts on a pressure chamber makes opening and closing strokes of the spool valve establish accuracy, thereby carrying out control of the flow-rate with accuracy.

If a vehicle is suddenly accelerated or decelerated with a pilot valve being at a predetermined opening degree by a predetermined exciting current, an evaporator-side pressure upstream a flow-rate control valve of a low-pressure side refrigerator path varies. Since the evaporator-side pressure is maintained at constant pressure, and variation of a control temperature of the evaporator due to sudden acceleration or deceleration of a vehicle is prevented.

Further a crank chamber communicates with an evaporator side upstream a flow-rate control valve of a low-pressure side refrigerant path through a pressure regulating path such that a pressure of the crank chamber is constantly maintained at the identical value, and variation of the pressure due to blowby gas is prevented, thereby improving accuracy of variable control of capacity.

Since a pressure chamber of the flow-rate control valve communicates with a refrigerant suction chamber through a pressure regulating path, it is possible to quickly allow working pressure of the pressure chamber to escape to the refrigerant suction chamber side to close a spool valve when a pilot valve is closed, thereby improving responsivity.

BEST MODE FOR CARRYING OUT THE INVENTION

An embodiment of the present invention will be described below in detail by reference to the drawings.

Figure 1:
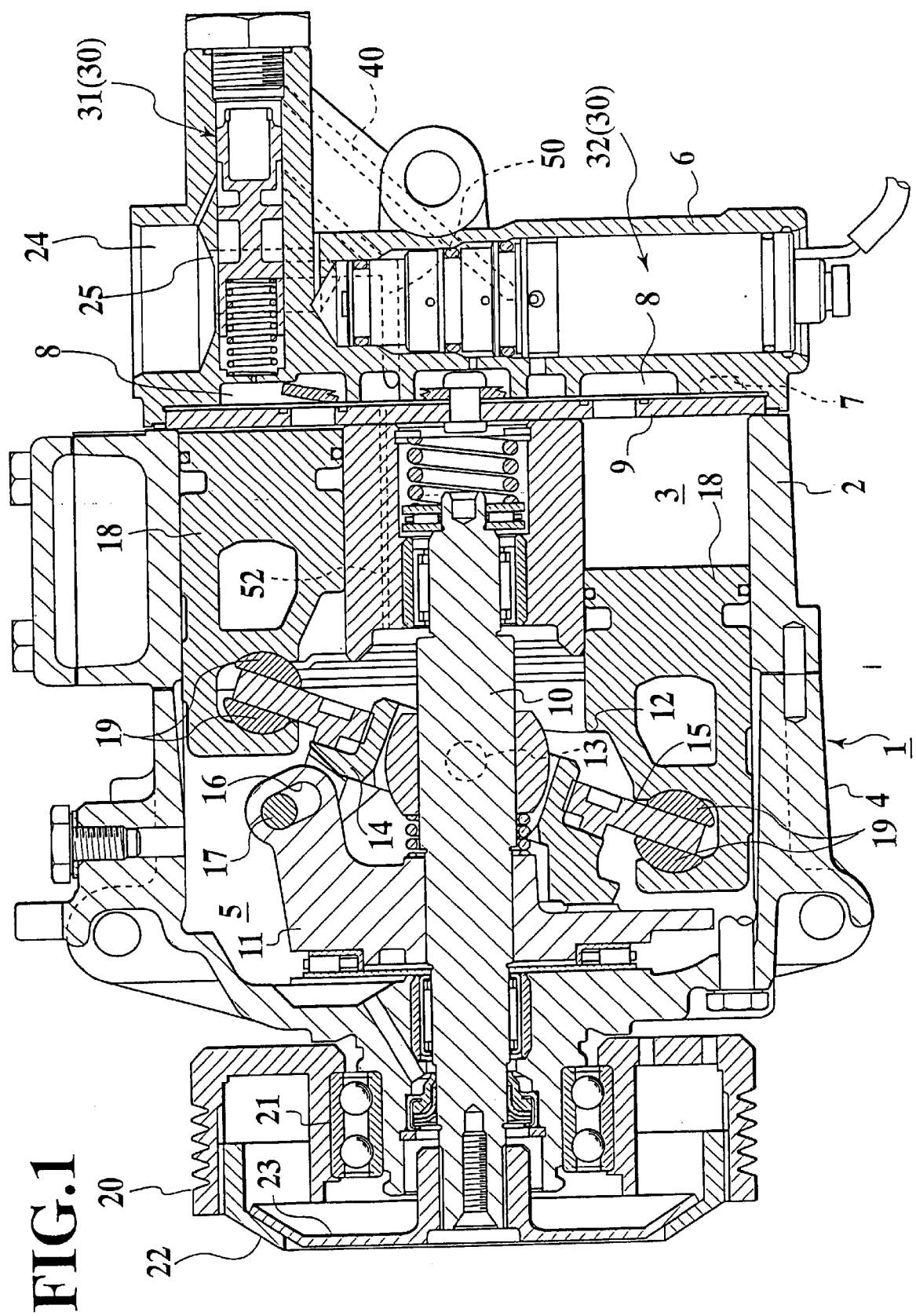
FIG. 1 is a sectional view showing an embodiment of the present invention.

In FIG. 1, a reference character 1 is a compressor housing and has a cylinder block 2 having a plurality of cylinder bores 3, a front housing 4 disposed on a front side of the cylinder block 2 and forming a crank chamber 5 between the cylinder block 2 and the front housing 4, and a rear housing 6 disposed on a rear side of the cylinder block 2 through a valve plate 9 and forming a refrigerant suction chamber 7 and a refrigerant discharge chamber 8.

Within the crank chamber 5, there is provided with a drive plate 11 secured to a drive shaft 10, a journal 14 connected for swinging to a sleeve 12 through a pin 13, and a swash plate 15 screwed to an outer periphery of the journal 14, the sleeve 12 being fitted for sliding with the drive shaft 10.

The journal 14 is connected to a drive plate 11 through an arc-shaped elongated hole 16 of the drive plate 11 and a pin 17 and swinging of the journal 14 is restricted by the elongated hole 16.

A piston 18 fitted with each cylinder bore 3 is connected to the swash plate 15 through a pair of shoes 19 between which the swash plate 15 is interposed.

To an outer end portion of the drive shaft 10, a pulley 20 is rotatably mounted through a bearing 21. A first driving transmitting plate 22 screwed to an inner periphery of the pulley 20 and a second driving transmitting plate 23 fixed to an end of the drive shaft 10 are connected for sliding at driving torque equal to or greater than a certain value, thereby rotating the drive shaft 10 by the pulley 20.

An inclination angle of the swash plate 15 is controlled by a differential pressure between the refrigerant suction chamber 7 and the crank chamber 5 regulated by pressure regulating means 30 disposed in the rear housing 6. By a change in the angle of the swash plate 15, a stroke of the piston 18 is changed to vary a discharge capacity of the refrigerant.

Figure 2:
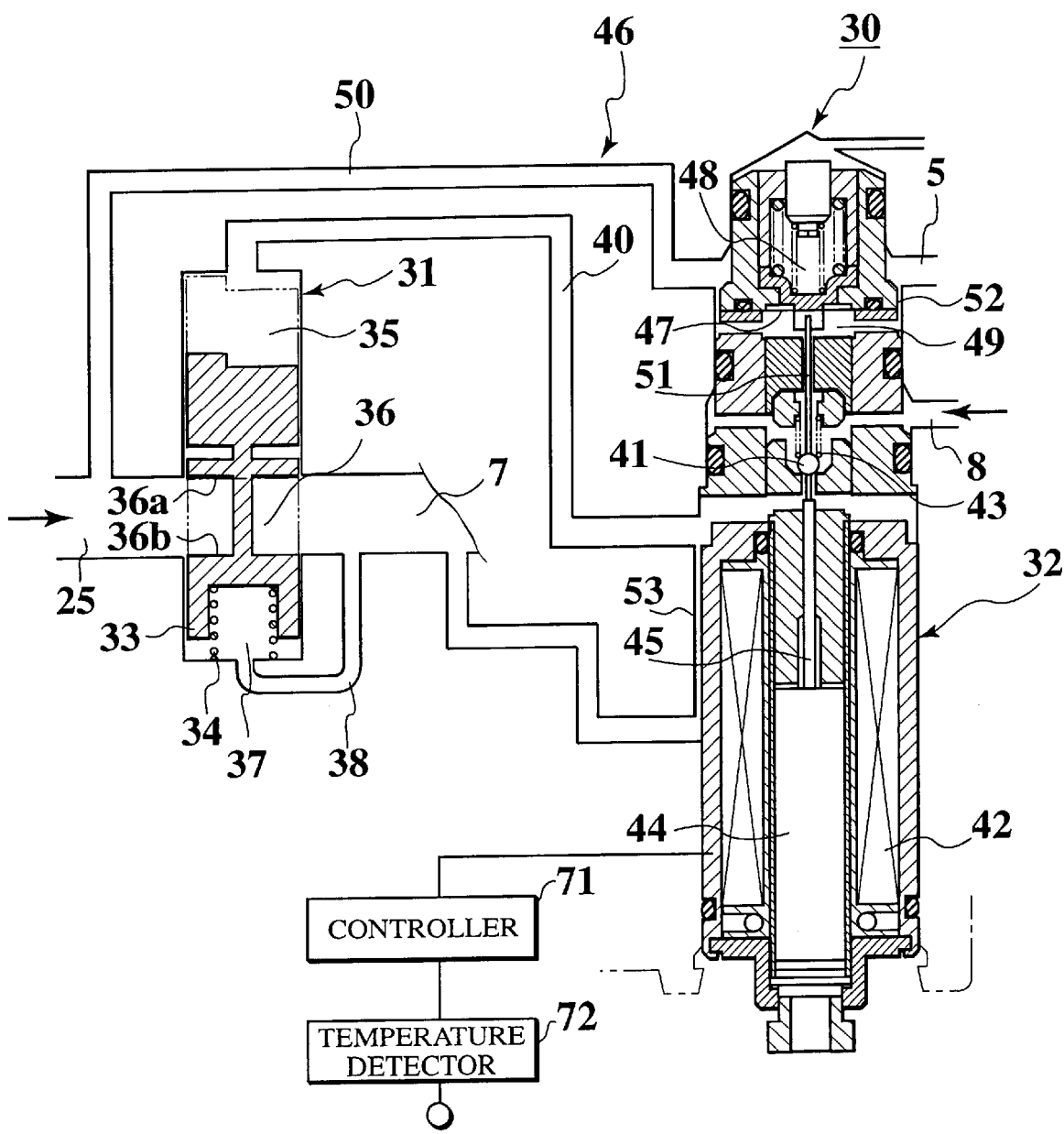
FIG. 2 is a sectional explanatory view systematically showing pressure regulating means of the embodiment.

As shown in FIG. 2, the pressure regulating means 30 is formed of a flow-rate control valve 31 installed in a low-pressure side refrigerant path 25 in a vicinity of a refrigerant inlet 24 that is upstream of the refrigerant suction chamber 7 and for directly controlling a flow-rate of the refrigerant following into the refrigerant suction chamber 7 and a flow-rate control valve drive mechanism 32 for controlling driving of the flow-rate control valve 31.

The flow-rate control valve 31 has a spool valve 33 disposed to be orthogonal to the low-pressure side refrigerant path 25, a spring 34 for biasing the spool valve 33 in a valve closing direction, and a pressure chamber 35 for accumulating pressure for moving the spool valve 33 in the valve opening direction.

Pressure receiving areas of opposite side faces 36a and 36b of a spool groove 36 of the spool valve 33 are equal to each other.

A spring chamber 37 that accommodates the spring 34 communicates with a refrigerant suction chamber 7 side that is downstream from the flow-rate control valve 31 in the low-pressure side refrigerant path 25 through a path 38.

The flow-rate control valve drive mechanism 32 has a ball valve 41 as a pilot valve provided in a path 40 through which the refrigerant discharge chamber 8 communicates with the pressure chamber 35 and for introducing and controlling high-pressure side refrigerant in the refrigerant discharge chamber 8 as working pressure into the pressure chamber 35 and a solenoid 42 for controlling a valve opening degree of the ball valve 41 in accordance with the exciting current.

The ball valve 41 is seated in a valve seat by the spring 43 to be closed in a normal condition.

The solenoid 42 moves an armature 44 upward in FIG. 2 when the exciting current is supplied to the solenoid 42 to push and move a plunger 45, thereby controlling the valve opening degree of the ball valve 41.

The flow-rate control valve drive mechanism 32 has feedback means 46 for detecting evaporator-side pressure upstream of the flow-rate control valve 31 in the low-pressure side refrigerant path 25 and for maintaining the evaporator-side pressure variably controlled by the exciting current of the solenoid 42 at a constant value.

The feedback means 46 has a diaphragm 47 for separating an atmospheric pressure chamber 48 and a refrigerant pressure chamber 49 from each other, a path 50 for introducing the evaporator-side pressure into the refrigerant pressure chamber 49, and a plunger 51 retained by the diaphragm 47, coaxially facing the plunger 45 of the solenoid 42, and in contact with the ball valve 41, and the feedback means senses a variation in the evaporator-side pressure in the low-pressure side refrigerant path 25 by the diaphragm 47 when the pressure varies from certain pressure, actuates the ball valve 41 in a valve closing direction or the valve opening direction, and regulates the valve opening degree of the flow-rate control valve 31 to maintain the evaporator-side pressure at a constant value.

The refrigerant chamber 49 communicates with the crank chamber 5 through a pressure regulating path 52 to cause the crank chamber 5 to communicate with the evaporator side of the low-pressure side refrigerant path 25.

On the other hand, with a side downstream from the ball valve 41 in a path 40 that communicates with the pressure chamber 35 of the flow-rate control valve 31, a pressure regulating path 53 that communicates with the refrigerant suction chamber 7 communicates and the pressure chamber 31 communicates with the refrigerant suction chamber 7 through the pressure regulating path 53.

A controller 71 is connected to the solenoid 42 and a temperature detector 72 for detecting a temperature of the evaporator is connected to the controller 71. The controller 71 has a CPU (Central Processing Unit), a RAM (Random Access Memory), and a ROM (Read-Only Memory), for example, and adjusts the exciting current of the solenoid 42 in dependence on the temperature of the evaporator detected by the temperature detector 72.

Next, operation and a controlling method of the present embodiment will be described by using FIGS. 1 to 3.

Figure 3:
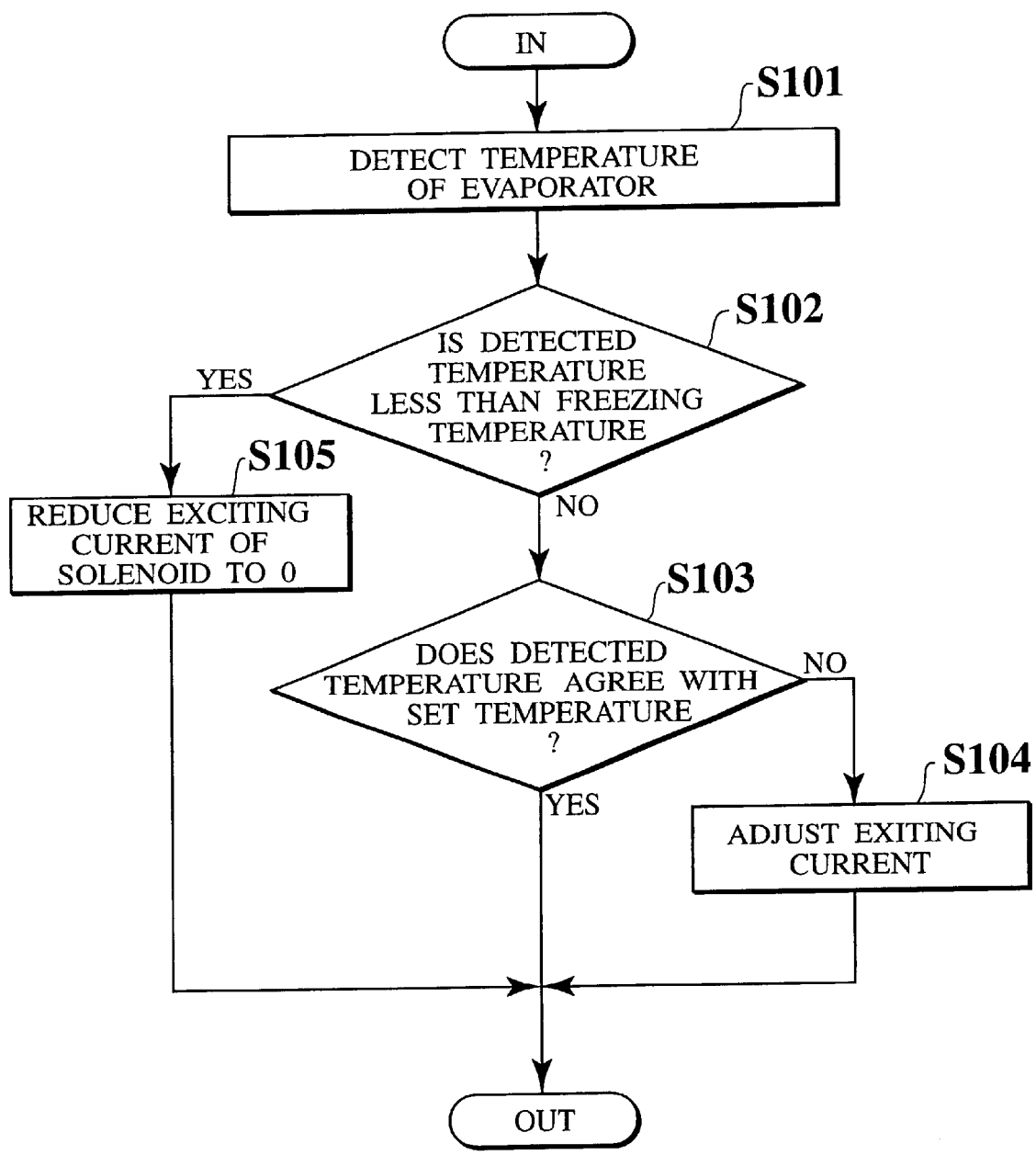
FIG. 3 is a flowchart showing control of the embodiment.

In FIG. 3, the temperature detector 72 detects the temperature of the evaporator (S101). When the detected temperature is higher than a preset freezing temperature (S102), whether the detected temperature and a set temperature agree with each other is judged (S103). If they do not agree with each other, the exciting current passed through the solenoid 42 is adjusted (S104) and the above control is repeated until the detected temperature and the set temperature agree with each other.

At this time, in FIG. 2, if the solenoid 42 is excited, the valve opening degree of the ball valve 41 is controlled in accordance with the exciting current, the high-pressure side refrigerant in the refrigerant discharge chamber 8 flows through the ball bearing 41 into the path 40 and is introduced into the pressure chamber 35 of the flow-rate control valve 31 as the working pressure.

According to the pressure in the pressure chamber 35, the spool valve 33 moves in the valve opening direction against spring force of the spring 34. It widens a flow path of the low-pressure side refrigerant path 25 to control the flow-rate of the refrigerant flowing into the refrigerant suction chamber 7. It regulates the differential pressure between the refrigerant suction chamber 7 and the crank chamber 5 to control the inclination angle of the swash plate 15. It changes the stroke of each the piston 18 to control a discharge rate of the refrigerant, thereby carrying out temperature control of the evaporator that is on an outside of the drawing.

On the other hand, in FIG. 3, if it is judged that the detected temperature of the evaporator is equal to or less than the freezing temperature (S102), the exciting current of the solenoid 42 is reduced to zero (S105).

In other words, in FIG. 2, in order to reduce the flow-rate of the refrigerant flowing into the refrigerant suction chamber 7 to zero and to stop reduction of the pressure on the evaporator side upstream of the flow-rate control valve 31 of the low-pressure side refrigerant path 25 for the purpose of preventing freezing of the evaporator in operation of a refrigerant cycle, current supplied to the solenoid 42 is reduced to zero to demagnetize the solenoid 42. Since the ball valve 41 is closed by demagnetization of the solenoid 42 to stop supplying of the working pressure to the pressure chamber 35 of the flow -rate control valve 31, the spool valve 33 is closed by the spring force of the spring 34 to close the low-pressure side refrigerant path 25, for the flow-rate of the refrigerant flowing into the refrigerant suction chamber 7 to be reduced to zero, for reduction of the evaporator-side pressure of the low-pressure side refrigerant path 25 to be stopped, and for the evaporator to be prevented from freezing.

As described above, supply of the exciting current to the solenoid 42 can be stopped in operation for preventing freezing of the evaporator, and it is possible to reduce the power consumption. Moreover, since a load of the compressor is reduced to substantially zero by totally closing the spool valve 33, it is possible to improve output of a driving source.

Furthermore, as described above, if supply of the exciting current to the solenoid 42 is stopped and the spool valve 33 of the flow-rate control valve 31 is closed as described above, the pressure of the refrigerant suction chamber 7 decreases to increase the differential pressure between the refrigerant suction chamber 7 and the crank chamber 5 to a maximum value, the inclination of the swash plate 15 is raised to reduce the stroke of each the piston 18 to a minimum value and to reduce compressing work of the compressor to substantially a zero, thus operation of the compressor can be turned on and off by exciting and demagnetizing the solenoid 42 without the clutch.

Therefore, the structure of the compressor can be simplified, a size and a weight of the structure can be reduced, and the structure can be obtained at advantageous cost.

Especially in the present embodiment, since the pressure receiving areas of the opposite side faces 36a and 36b of the spool groove 36 of the spool valve 33 of the above flow-rate control valve 31 are equal to each other, it is possible to obtain accuracy of opening and closing strokes of the spool valve 33 by only controlling the spring force of the spring 34 for biasing the spool valve 33 in the valve closing direction and the working pressure that acts on the pressure chamber 35, thereby carrying out control of the flow-rate with high accuracy.

If the vehicle is suddenly accelerated or decelerated in a state in which the predetermined exciting current is supplied to the solenoid 42 of the flow-rate control valve drive mechanism 32 and the ball valve 41 is controlled such that the opening degree of the ball valve 41 is a predetermined value, the evaporator-side pressure upstream of the flow-rate control valve 31 of the low-pressure side refrigerant path 25 varies due to a change in a rotation number of the compressor. However, the evaporator-side pressure can be maintained at constant pressure appropriate to the exciting current of the solenoid 42 by the feedback means 46, it is therefore possible to prevent variation of a control temperature of the evaporator due to sudden acceleration and deceleration of the vehicle.

Furthermore, since the crank chamber 5 communicates with the evaporator side upstream of the flow-rate control valve 31 of the low-pressure side refrigerant path 25 through the pressure regulating path 52 such that the pressure of the crank chamber 5 is constantly maintained at the identical value, it is possible to prevent variation of the pressure in the crank chamber due to blowby gas, thereby improving accuracy of variable control of capacity.

Moreover, since the pressure chamber 35 of the flow-rate control valve 31 communicates with the refrigerant suction chamber 7 through the pressure regulating path 53, it is possible to quickly allow the working pressure of the pressure chamber 35 to escape to the refrigerant suction chamber 7 side to close the spool valve 33 when the ball valve 41 is closed by demagnetization of the solenoid 42 of the flow-rate control valve drive mechanism 32, thereby improving responsivity.

INDUSTRIAL APPLICABILITY

As described above, a swash plate variable displacement compressor of the present invention is adapted to a refrigeration cycle of an air conditioning system for a vehicle, for example, and is useful in reducing manufacturing cost of the air conditioning system and preventing an evaporator from freezing.

What is claimed is:

1. A variable displacement swash plate compressor comprising:

a flow-rate control valve installed in a low-pressure side refrigerant path upstream refrigerant suction chamber, and having a spool valve, a spring for biasing the spool valve in a valve closing direction, and a pressure chamber for accumulating pressure for the spool valve to be worked in the valve opening direction; and a flow-rate control valve drive mechanism installed in a path for communication between a refrigerant discharge chamber and the pressure chamber, and having a pilot valve to be normally closed by a spring and to be controlled of a valve opening degree by an exciting current of a solenoid for a high-pressure side refrigerant of the refrigerant discharge chamber to be introduced and controlled as working pressure to the pressure chamber, wherein a flow-rate of a refrigerant to flow in the refrigerant suction chamber is controlled for pressures of the refrigerant suction chamber and a crank chamber to be regulated.

2. A variable displacement swash plate compressor according to claim 1, wherein the spool valve has a spool groove having opposite side faces having pressure receiving areas equal to each other.

3. A variable displacement swash plate compressor according to claim 1, wherein the flow-rate control valve drive mechanism detects an evaporator-side pressure upstream the flow-rate control valve, for the pilot valve to be operated in the valve opening direction or a valve closing direction when the evaporator-side pressure varies from a certain pressure with the pilot valve being in a predetermined opening degree, for an opening degree of the flow-rate control valve to be regulated, and for the evaporator-side pressure to be maintained at a constant value.

4. A variable displacement swash plate compressor according to claim 1, wherein the flow-rate control valve drive mechanism comprises a pressure regulating path for communication between the crank chamber and the evaporator-side of the low-pressure side refrigerant path upstream the flow-rate control valve.

5. A variable displacement swash plate compressor according to claim 1, wherein the flow-rate control valve drive mechanism comprises a pressure regulating path for communication between the pressure chamber of the flow-rate control valve and the refrigerant suction chamber.

6. A variable displacement swash plate compressor according to claim 1, further comprising:

a temperature detector for detecting a temperature of an evaporator; and a controller for controlling a valve opening degree of the pilot valve in accordance with the temperature of the evaporator detected-by the temperature detector.

7. A variable displacement swash plate compressor according to claim 6, wherein the controller demagnetizes the solenoid for the pilot valve to be closed when the temperature detector detects the temperature of the evaporator less than a freezing temperature.

8. A control method for a variable displacement swash plate compressor comprising:

demagnetizing a solenoid for a pilot valve to be closed when an evaporator is at a temperature less than a freezing temperature;

closing a spool valve for a pressure of a refrigerant suction chamber to be fallen lower than that of a crank chamber; and raising an inclined swash plate for a compressing work of the compressor to be reduced to substantially a zero.

* * * * *